United States Patent
Gai et al.

(10) Patent No.: US 9,242,711 B2
(45) Date of Patent: Jan. 26, 2016

(54) STEERING SYSTEM FOR BOATS

(71) Applicant: ULTRAFLEX S.p.A., Casella (GE) (IT)

(72) Inventors: Giorgio Gai, Busalla (IT); Marco Campagna, Genoa (IT)

(73) Assignee: ULTRAFLEX S.P.A, Casella (GE) (IT)

( * ) Notice: Subject to any disclaimer, the term of this patent is extended or adjusted under 35 U.S.C. 154(b) by 408 days.

(21) Appl. No.: 13/719,550

(22) Filed: Dec. 19, 2012

(65) Prior Publication Data

US 2013/0160689 A1 Jun. 27, 2013

(30) Foreign Application Priority Data

Dec. 23, 2011 (IT) .............................. GE2011A0146

(51) Int. Cl.
| | |
|---|---|
| *B63H 25/02* | (2006.01) |
| *B63H 25/10* | (2006.01) |
| *F16C 1/18* | (2006.01) |
| *F16C 1/20* | (2006.01) |
| *F16H 19/06* | (2006.01) |
| *F16C 1/10* | (2006.01) |

(52) U.S. Cl.
CPC ............. *B63H 25/10* (2013.01); *B63H 25/02* (2013.01); *F16C 1/18* (2013.01); *F16C 1/20* (2013.01); *F16H 19/0631* (2013.01); *F16C 1/106* (2013.01); *Y10T 74/18848* (2015.01)

(58) Field of Classification Search
CPC ............ B62D 1/20; B62D 3/02; B62D 5/001; B62D 7/16; B63H 25/10; B63H 25/02; F16H 19/003; F16H 19/06; F16H 19/0618; F16H 2019/0677; F16H 19/0631; F16C 1/10; F16C 1/12; F16C 1/20; F16C 1/205; F16C 1/106; F16C 1/18; F16L 11/081; F16L 11/083; F16L 11/16; F16L 11/24; Y10T 74/18848

USPC .................. 74/496, 498, 500.5, 502.4, 502.5, 74/502.6, 89.2, 89.21, 89.22; 114/154; 138/129, 130, 131, 134; 180/6.38; 280/93.502, 93.513

See application file for complete search history.

(56) References Cited

U.S. PATENT DOCUMENTS

| | | | | |
|---|---|---|---|---|
| 2,890,595 | A | * 6/1959 | Loeffler | ........................... 74/498 |
| 3,093,162 | A | 6/1963 | Reiling | |
| 3,135,130 | A | 6/1964 | Sydney | |
| 3,135,132 | A | * 6/1964 | Bratz | ........................... 74/502.3 |
| 3,206,998 | A | * 9/1965 | Hill et al. | ........................ 74/494 |
| 3,258,990 | A | 7/1966 | Bratz | |
| 3,359,822 | A | 12/1967 | Hurlow | |
| 3,774,568 | A | * 11/1973 | Borst et al. | ................ 114/144 R |
| 3,832,967 | A | * 9/1974 | Waner et al. | .............. 114/144 R |
| 3,838,607 | A | * 10/1974 | Hemens | ........................ 74/496 |

(Continued)

FOREIGN PATENT DOCUMENTS

FR 2662137 11/1991

*Primary Examiner* — Laura Freedman
(74) *Attorney, Agent, or Firm* — Themis Law

(57) ABSTRACT

A steering system for boats includes a control member of the steering wheel type, lever type or the like connected to a driving shaft of a transmission composed of at least two transmission elements dynamically engaged one with the other, of which one is an input and the other one an output elements. The output element drives a member transferring the motion of the control member to an operating unit, such that a movement/rotation of the control member is transmitted to the transfer member through such transmission. Moreover, at least the input element is produced from a material obtained by a sintering process.

7 Claims, 4 Drawing Sheets

(56) References Cited

U.S. PATENT DOCUMENTS

| | | | | |
|---|---|---|---|---|
| 3,858,616 A | * | 1/1975 | Thiery et al. | 138/133 |
| 3,870,007 A | * | 3/1975 | Morse | 114/160 |
| 3,921,674 A | * | 11/1975 | Logan et al. | 138/130 |
| 4,005,614 A | * | 2/1977 | Moore et al. | 74/502.2 |
| 4,009,677 A | * | 3/1977 | Croisant | 440/6 |
| 4,014,281 A | | 3/1977 | Hemens | |
| 4,131,757 A | * | 12/1978 | Felkel | 174/107 |
| 4,167,645 A | * | 9/1979 | Carey | 174/47 |
| 4,193,319 A | * | 3/1980 | Langford | 74/502.5 |
| 4,326,561 A | * | 4/1982 | Kutnyak | 138/136 |
| 4,449,420 A | | 5/1984 | Baba | |
| 4,459,168 A | * | 7/1984 | Anselm | 156/143 |
| 4,537,222 A | * | 8/1985 | Schwarz | 138/130 |
| 4,577,716 A | * | 3/1986 | Norton | 180/446 |
| 4,898,046 A | | 2/1990 | Mancewicz | |
| 5,019,057 A | * | 5/1991 | Truckai | 604/527 |
| 5,111,761 A | * | 5/1992 | Gilbertson | 114/160 |
| 5,443,279 A | * | 8/1995 | Nurnberger | 280/236 |
| 5,526,849 A | * | 6/1996 | Gray | 138/133 |
| 5,607,529 A | * | 3/1997 | Adamczyk et al. | 156/143 |
| 6,109,306 A | * | 8/2000 | Kleinert | 138/127 |
| 6,227,249 B1 | * | 5/2001 | Akedo et al. | 138/137 |
| 6,255,592 B1 | * | 7/2001 | Pennington et al. | 174/103 |
| 6,276,120 B1 | * | 8/2001 | Adriaensen et al. | 57/210 |
| 6,546,889 B1 | * | 4/2003 | Jacob et al. | 114/144 R |
| 6,742,545 B2 | * | 6/2004 | Fisher et al. | 138/137 |
| 7,409,815 B2 | * | 8/2008 | Clough et al. | 57/212 |
| 7,614,428 B2 | * | 11/2009 | Henry et al. | 138/124 |
| 7,819,039 B2 | * | 10/2010 | Kim | 74/552 |
| 2003/0188792 A1 | * | 10/2003 | Donnelly | 138/122 |
| 2008/0138562 A1 | * | 6/2008 | Kotthoff et al. | 428/66.1 |
| 2008/0240966 A1 | * | 10/2008 | Sevelsted et al. | 418/143 |
| 2008/0314470 A1 | * | 12/2008 | Trace et al. | 138/125 |
| 2008/0314675 A1 | * | 12/2008 | Nozaki et al. | 180/305 |
| 2009/0095118 A1 | | 4/2009 | Kim | |
| 2014/0338476 A1 | * | 11/2014 | Miller et al. | 74/89.2 |

* cited by examiner

STEERING SYSTEM FOR BOATS

FIELD OF THE INVENTION

The present invention relates to a steering system for boats that includes at least one control member of the steering wheel type, lever type or the like, connected to a driving shaft of a transmission composed of at least two transmission elements dynamically engaged one with the other, of which one is an input and the other an one output transmission element. The output element drives a member transferring the motion of the control member to an operating unit, such that a movement/rotation of the control member is transmitted to the transfer member through the transmission.

BACKGROUND OF THE INVENTION

The arrangement just described is a standard one for a steering system for boats, particularly for a mechanical steering system for controlling boats.

Such steering systems have a control member, whose movement drives the components of a transmission transferring the movement of the control member through a corresponding operation of an operating unit to control, for example, steering actuators.

The transmission of such steering systems must be particularly efficient, namely, the input element has to dynamically engage the output element without generating "clearances" to efficiently transmit the movement of the control member to the transfer member and to an operating unit.

The components of such transmission system are subject to high stresses. Firstly, such components are subjected to stresses related to mechanical operation, namely, the continuous changes in direction related to boat movements generate continuous fatigue cycles that wear the components out, causing a deterioration that leads to malfunctions and inefficiencies in the performance of the entire steering system.

Secondly, the wear on the transmission components can be due to external agents related to the environment where the steering systems operate, i.e. the marine environment, which is particularly aggressive against the different components.

Finally, "clearances" in the dynamic coupling of the transmission components can create a relative movement between the components affecting the "softness" of the steering system, which is the fluidity of the control member during movement, as well as the quickness of response of the operating unit according to the movement of the control member.

Therefore, there is an unsatisfied need for a steering system for boats, particularly a mechanical steering system, which by means of relatively simple and inexpensive arrangements solves prior art drawbacks, and in particular provides an improvement in the performance and efficiency of transmissions of prior art steering systems.

SUMMARY OF THE INVENTION

The present invention achieves the above aims by providing a steering system of the above described type, wherein at least the input element is produced from a material obtained by a sintering process.

Generally, the components of known prior art transmissions, such as gears or the like, are made of metal material obtained by pressure die-casting processes, since with such processes components can be obtained that are valid as regards the performance in relation to the low wear level of the components in response to the effect of external agents.

Therefore, there is a technical prejudice related to the use of sintered materials in mechanical steering systems which is solved by the present invention.

The components made from sintered material in theory are affected by oxidation due to external agents more than pressure die-cast materials, however such oxidation is avoided because transmission is generally provided inside an air-tight case and the different components are lubricated to improve operation.

A particularly advantageous aspect in the use of sintered materials compared to pressure die-cast materials is due to the fact that the pressure die-casting process is not easy to control, hence the risk of the formation of blowholes or cracks in the components is high. That does not occur with the sintering process, which, besides being easier to control, is more repeatable.

The absence of cracks or blowholes inside the transmission components increases the safety of the entire steering system, reducing the frequency of breaking of the individual transmission components.

Moreover, the sintering process has a simpler processing, thus producing components whose dynamic coupling is obtained more accurately, increasing the performance of the transmission and reducing the wear of the different components.

Therefore, the use of sintered materials makes it possible to produce steering systems that are "softer" as regards fluidity of control and being better performing compared with steering systems known in the prior art.

According to a possible embodiment, the transmission is composed of at least a first gear wheel engaging at least a second gear wheel, which drives the member transferring the motion of the control member to an operating unit.

Such gear wheels are made at least partially by using sintered materials.

Therefore, the transmission of the steering system of the present invention is preferably composed of gears with gear wheels that dynamically engage each other, in order to transmit the movement of the control member to an operating unit through the motion transfer member.

According to a preferred arrangement, the transmission is composed of a central pinion driven to rotate by the control member. The central pinion engages at least two peripheral pinions, which in turn engage the internal toothing of a gear wheel, which drives the motion transfer member.

The central pinion and the peripheral pinions are rotatably mounted each one about a corresponding axis of rotation such that the rotation of the central pinion drives the motion transfer member.

The described arrangement meets one of the requirements for mechanical steering systems, that is, having a good gear ratio of the control member movement to the transfer member motion, such that, in order to perform the necessary maneuvers, short movements of the control member are required.

The above described transmission not only improves the gear ratio but also provides for the force, the central pinion has to exert on one or more peripheral pinions, to be discharged, reducing wear and possible damages of the pinion teeth.

The reduction in the wear and the higher operating efficiency is further provided by making the central pinion and the peripheral pinions of sintered material.

A variant embodiment provides also for the gear wheel to be made of sintered material.

Even in this case, the use of sintered materials increases the safety of the steering system, preventing the transmission gears from being broken. Moreover, the sintering process allows items to be obtained without draft angle, improving the accuracy of the dynamic coupling of the pinions.

Additional characteristics and improvements of a steering system according to the present invention are described below and are mainly directed to improving the performance of the steering system.

In one embodiment there is provided a sliding element of the bearing type or the like mounted on the gear wheel such to facilitate the sliding thereof and to improve the transmission of the motion of the control member to the transfer member.

In general, any types of bearings among those known in the prior art may be used, such as for example radiant, rolling, magnetic bearings which are inserted instead of the usual plain bushings provided in the steering systems of the prior art.

As an alternative, in order to accomplish the same function, it is possible to provide high performance bushings, namely made of materials that allow the coefficient of friction among the moving parts to be reduced.

Similar arrangements directed at facilitating the relative movement between two parts can be provided in all the components of the transmission system of the steering system.

Therefore, it is possible to provide to insert bearings or high performance bushings on pinions or on the driving shaft of the control member.

As mentioned, the gear wheel is the output member intended to transmit the motion to the transfer member, which is intended to transfer the motion of the control member to an operating unit.

Consequently the transfer member can be of any type known in the prior art, therefore the movement of the gear wheel can drive, for example, a rocking lever, an actuator or a rocker arm.

In a preferred variant embodiment, the motion transfer member is composed of a push and/or pull cable mounted to slide into a sheath and the movement of such cable is driven by the gear wheel, with at least one locking element for the cable provided on the gear wheel.

The push and/or pull cable can have the known features of the so called "push/pull" cables, which are widely described in Italian patent applications GE2007A000066 and SV2004A000001 to the same applicant and GE2008A000089.

The cable of the steering system of the present invention has features that allow it to be mounted such to avoid tortuous paths and excessively sharp curves, thereby allowing the driver to steer the boat easily at all the speeds, and to reduce inefficiencies and clearances in the system.

In one embodiment, the push and/or pull cable of a steering system according to the present invention comprises a central core covered by a plurality of strands helically wound about the longitudinal axis of the central core.

Moreover, the plurality of strands is composed of strands of metal material and of strands of plastic material.

The presence of plastic strands facilitates the sliding of the cable inside the sheath without the need to completely cover the cable with plastic material. The plastic coating on prior art cables facilitates the sliding, but has problems related to finding the points where the cable has to be secured to the gear wheel.

The plastic coating of prior art cables is sealed to the metal core and finding the securing points requires removing, at least partially, the coating itself The plastic strands are preferably heat-sealed to the central core.

According to an improvement, the plurality of strands provides for each plastic strand to be placed between two metal strands and/or each metal strand to be placed between two plastic strands.

The above mentioned features can be provided as an alternative or in combination to the constructive features described in the above described patent applications.

The present invention further relates to a pull and/or push cable comprising a central core covered by a plurality of strands helically wound about the central core, the plurality of strands being composed of strands of metal material and of strands of plastic material.

Moreover, each plastic strand is placed between two metal strands and/or each metal strand is placed between two plastic strands.

BRIEF DESCRIPTION OF THE DRAWINGS

These and other characteristics and advantages of the present invention will be more apparent from the following description of soma few embodiments shown in the enclosed drawings, wherein:

FIG. 1b is a section taken along a side plane of the variant embodiment of FIG. 1a;

DETAILED DESCRIPTION OF EMBODIMENTS OF THE INVENTION

The examples that are described below refer to a specific embodiment of a steering system for boats according the present invention and should not be considered as limiting of the inventive concept underlying the present invention.

Generally, a steering system for boats according to the present invention comprises at least one control member of the steering wheel type, lever type or the like, connected to a driving shaft of a transmission, which is composed of at least two transmission elements dynamically engaged one with the other, of which one is an input and the other one an output transmission element.

The output element drives at least one member transferring the motion of the control member to an operating unit, such that a movement/rotation of the control member is transmitted to the transfer member through the transmission.

At least the input element is made of a material obtained by a sintering process.

The general concept of making one or more of the transmission components of sintered materials applies to the embodiments shown below, but a particular arrangement of said components are shown, as well as a particular arrangement of the transfer member.

Figure 1A:
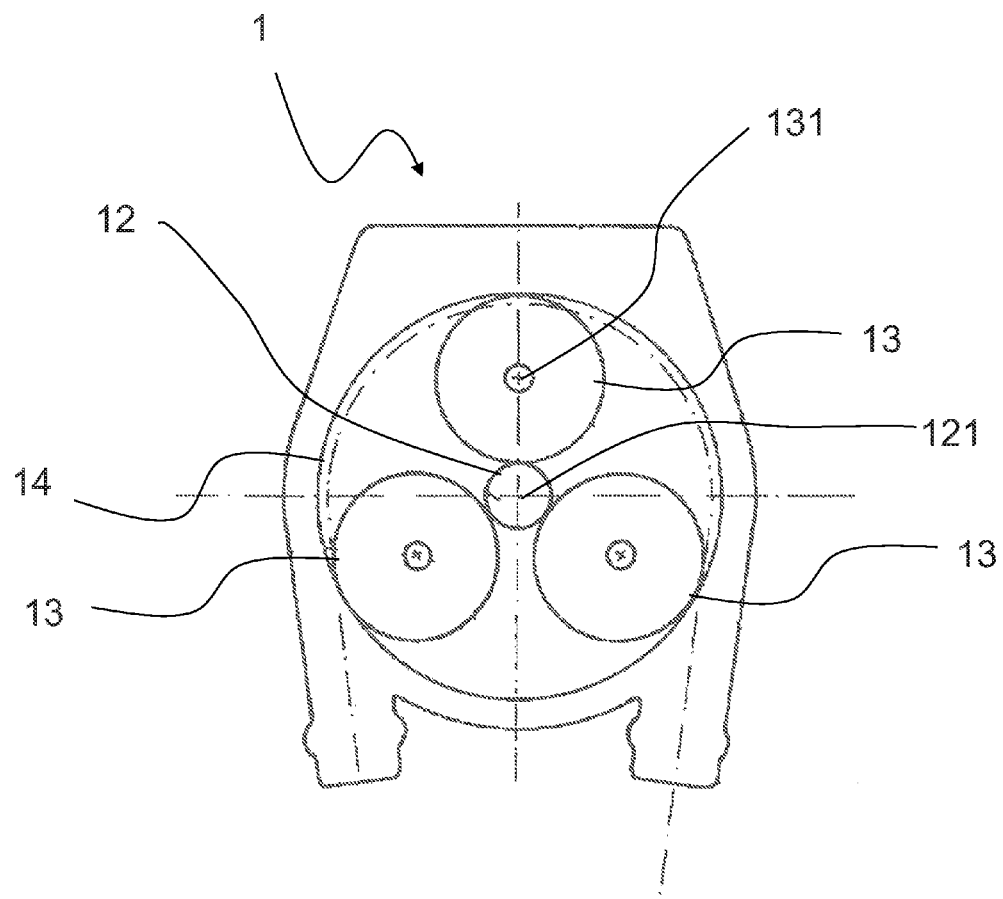
FIG. 1a is a diagram of a steering system for boats according to the present invention in a preferred variant embodiment.
Figure 1B:
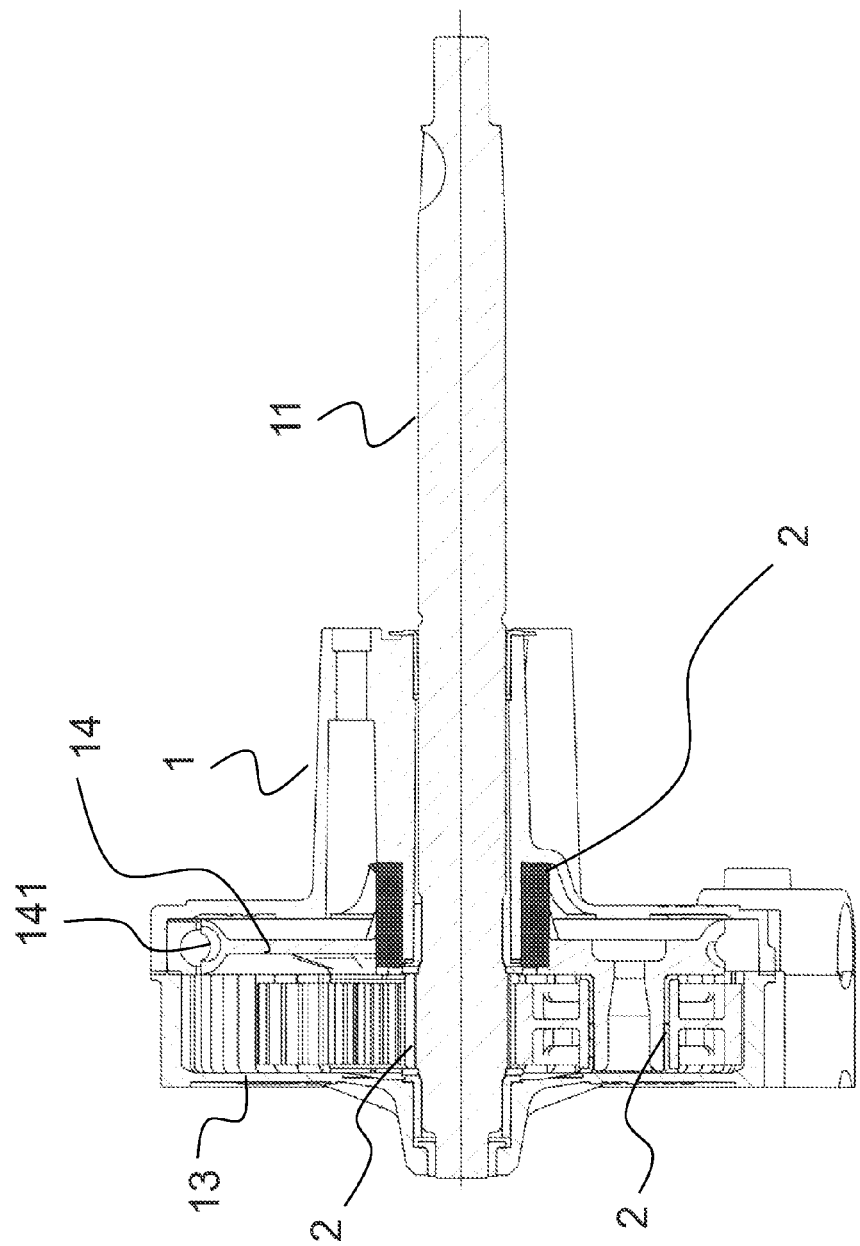
Figure 2:
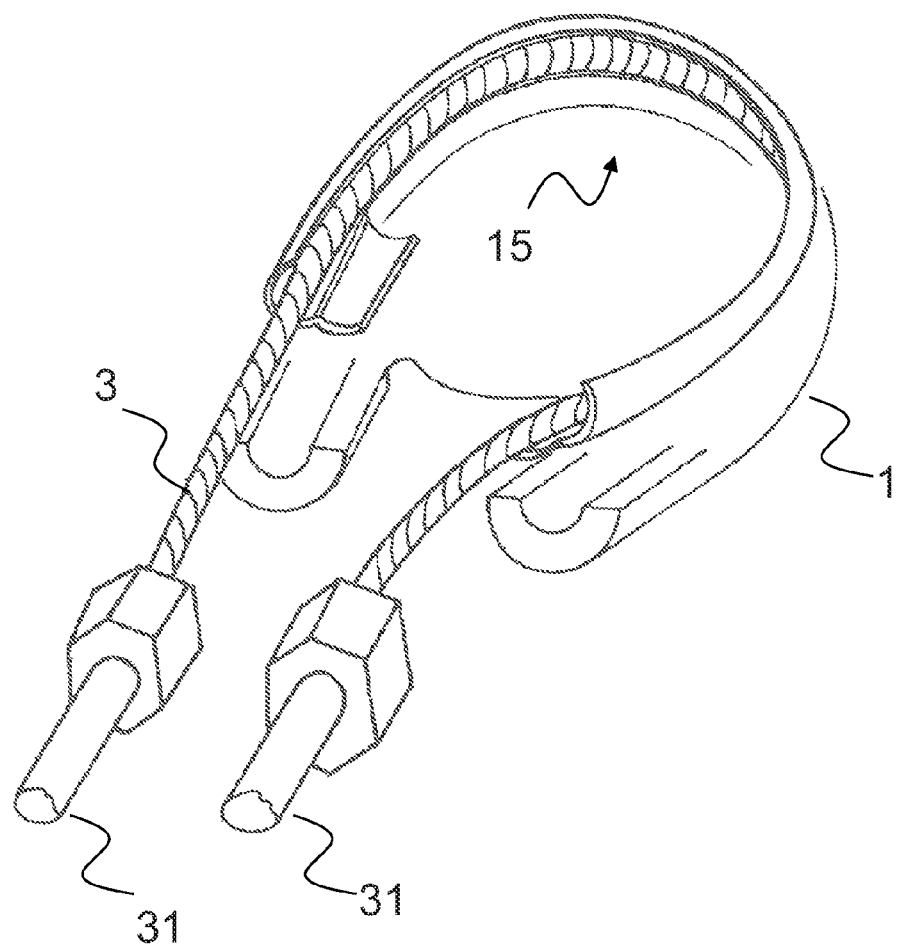
FIG. 2 is a detail of a steering system for boat according to the present invention.

With particular reference to FIGS. 1a and 1b, a steering system according to the present invention comprises a control member in the form of a steering wheel, whose rotation drives a driving shaft 11 connected to a transmission composed of a train of gear wheels, wherein the output gear wheel drives the transfer member on the basis of the rotation of the steering wheel and of the driving shaft.

In particular, the driving shaft 11 is connected to a central pinion 12, driven so as to rotate, which engages three different peripheral pinions 13, which in turn engage the internal toothing of a gear wheel 14 that drives the motion transfer member.

The central pinion 12 and the peripheral pinions 13 are rotatably mounted each one about a corresponding axis of rotation, 121 and 131 respectively, such that the rotation of the central pinion 12 drives the motion transfer member by the rotation of the gear wheel 14.

The gear wheel 14 has the same axis of rotation 121 as the central pinion 12 for constructional simplicity, but it any axis of rotation may be provided.

At the same time, FIG. 1a shows three peripheral pinions 13 arranged in such a way to engage contemporaneously different points of the central pinion 12 and to have the axes of rotation spaced from each other by an angular distance of 120°.

Such arrangement is the one that best allows a compromise between a high gear ratio and the overall dimensions of the steering system to be reached, but all the configurations known in the prior art are possible.

The transmission is further contained into an external case 1, where a cable 3 slides therein, the cable 3 being the motion transfer member, as will be described below.

FIG. 1b shows a section taken along a side plane of a steering system according to the present invention, wherein a sliding element of the bearing type or the like 2 is provided, mounted on the gear wheel 14, such to facilitate the rotation thereof.

The bearing 2 is placed between the gear wheel 14 and the driving shaft 11.

All the components of the transmission that have a rotation may be provided in combination with such sliding element. The sliding element can be composed of a bearing or a bushing made of a high performance material having a low coefficient of friction.

In particular, in FIG. 1b sliding elements 2 are provided mounted on the central pinion 12 and on peripheral pinions 13.

According to the embodiment shown in FIGS. 1a to 3b, the motion transfer member is composed of a push and/or pull cable mounted to slide inside a sliding sheath 15, the movement of the cable 3 being driven by the rotation of the gear wheel 14.

On the gear wheel 14 there are provided locking means 141 for the push and/or pull cable 3, such that the cable 3 is integral with the gear wheel 14 and its rotation corresponds to a movement of the cable 3.

The ends 31 of the cable 3 can then be connected to an operating unit not shown in the figures, in order to accomplish the motion driven by the control member.

Figure 3A:
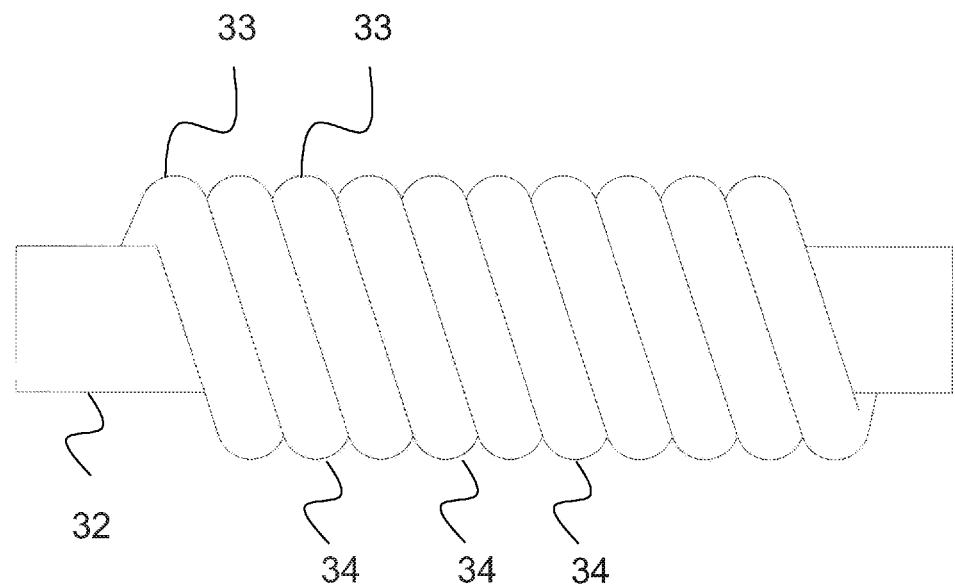
FIGS. 3a and 3b illustrate a cable of a steering system according to the present invention and show a view and a sectional plane passing along the longitudinal axis of the cable.
Figure 3B:
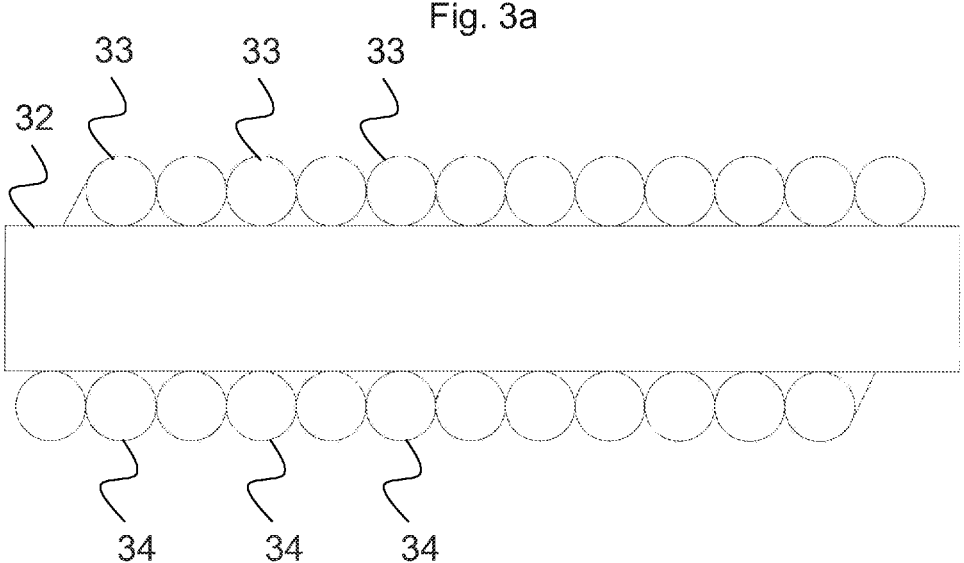

FIGS. 3a and 3b show a variant embodiment of the push and/or pull cable 3, in particular a view and a section taken along a plane passing along the longitudinal axis are shown.

According to such variant embodiment, the push and/or pull cable comprises a central core 32, coated by a plurality of strands helically wound about the longitudinal axis of the central core 32.

The plurality of strands is composed of strands of metal material 33 and of strands of plastic material 34.

In particular, the strands of metal type 33 and the strands of plastic material 34 are arranged such that each plastic strand 34 is placed between two metal strands 33 and each metal strand 33 is placed between two plastic strands 34.

FIG. 3b shows the cable according to a section along a plane passing by the longitudinal axis, such to show the proper arrangement of the metal strands 33 and plastic strands 34.

The invention claimed is:

1. A steering system for boats comprising:
    a control member connected to a driving shaft of a transmission,
    said transmission comprising at least two transmission elements dynamically engaged one with the other, one of said transmission elements being an input transmission element and one of said transmission elements being an output transmission element, said output transmission element driving a motion transfer member transferring a motion of said control member to an operating unit, such that a movement/rotation of said control member is transmitted to said motion transfer member through said transmission,
    wherein at least said input transmission element comprises a material obtained by a sintering process,
    wherein said motion transfer member comprises a pull and/or push cable mounted so as to slide into a sliding sheath, a movement of said pull and/or push cable being driven by a gear wheel,
    wherein said pull and/or push cable comprises a solid central core covered by a plurality of strands helically wound about a longitudinal axis of said solid central core, said plurality of strands comprising strands of metal material and strands of plastic material disposed adjacent and parallel to one another, and
    wherein, within said plurality of strands, each plastic strand is placed between two metal strands and each metal strand is placed between two plastic strands, or a plurality of the plastic strands is placed between two metal strands and a plurality of the metal strands is placed between two plastic strands;
    further comprising at least one locking element for said pull and/or push cable disposed on said gear wheel.

2. The steering system according to claim 1, wherein said transmission comprises said gear wheel engaged by a second gear wheel.

3. The steering system according to claim 1, wherein said transmission is composed of a central pinion caused to rotate by said control member, said central pinion engaging at least two peripheral pinions, said peripheral pinions engaging an internal toothing of said gear wheel, said gear wheel driving said motion transfer member,
    said central pinion and said peripheral pinions being each rotatably mounted about a corresponding axis of rotation such that the rotation of said central pinion drives said motion transfer member,
    wherein at least said central pinion and at least said peripheral pinions comprise a sintered material.

4. The steering system according to claim 3, further comprising a sliding element mounted on said gear wheel, such to facilitate a rotation thereof.

5. The steering system according to claim 4, wherein said sliding element is mounted on one or more of said central pinion or said peripheral pinions.

6. The steering system according to claim 4, wherein said sliding element is provided mounted on said driving shaft.

7. A pull and/or push cable comprising:
    a solid central core of the pull and/or push cable covered by a plurality of strands,
    wherein said strands are helically wound about said solid central core, said plurality of strands comprising strands of metal material and strands of plastic material disposed adjacent and parallel to one another, and
wherein each plastic strand is placed between two metal strands and each metal strand is placed between two plastic strands, or a plurality of the plastic strands is placed between two metal strands and a plurality of the metal strands is placed between two plastic strands.

\* \* \* \* \*